United States Patent

[11] 3,569,661

| [72] | Inventors | Robert W. Ebeling, Jr.<br>Maxatawny, Pa.;<br>George A. Klasson, Port Washington, N.Y. |
|---|---|---|
| [21] | Appl. No. | 831,319 |
| [22] | Filed | June 9, 1969 |
| [45] | Patented | Mar. 9, 1971 |
| [73] | Assignee | Air Products and Chemicals, Inc.<br>Allentown, Pa. |

[54] METHOD AND APPARATUS FOR ESTABLISHING A CATHODE STABILIZED (COLLIMATED) PLASMA ARC
11 Claims, 2 Drawing Figs.

| [52] | U.S. Cl. | 219/121,<br>219/75 |
|---|---|---|
| [51] | Int. Cl. | B23k 9/00 |
| [50] | Field of Search | 219/75,<br>121, 121 (P) |

[56] References Cited
UNITED STATES PATENTS

| 3,377,457 | 4/1968 | Pratt | 219/75 |
|---|---|---|---|
| 3,118,046 | 1/1964 | Harrington | 219/75 |

*Primary Examiner*—J. V. Truhe
*Assistant Examiner*—C. L. Albritton
*Attorneys*—Ronald B. Sherer and James C. Simmons ABSTRACT: Disclosed is a method and apparatus for establishing a cathode stabilized (collimated) plasma arc. The invention is characterized in that by utilizing a hollow tubular cathode and causing the cathode arc spot to locate on the inside wall of the cathode electrode the plasma arc becomes collimated and stabilized.

PATENTED MAR 9 1971

3,569,661

ROBERT W. EBELING JR.
GEORGE A. KLASSON
INVENTORS

BY James C. Simmons

ATTORNEY

METHOD AND APPARATUS FOR ESTABLISHING A CATHODE STABILIZED (COLLIMATED) PLASMA ARC

BACKGROUND OF THE INVENTION

This invention pertains to plasma arcs, generally, and in particular to collimated plasma arcs of the type employed for cutting and welding materials of construction such as metals.

Plasma arcs are known to the prior art as exemplified by U.S. Pat. No. 2,806,124 wherein there is described a method of generating a plasma arc.

A majority of prior art plasma arcs are generated by devices such as disclosed in U.S. Pat. No. 2,858,411, U.S. Pat. No. 3,118,046 and U.S. Pat. No. 3,194,941. All of the devices disclosed in the aforementioned and those known to the art rely upon the same method to produce the collimated plasma arc. This method is known as "wall stabilization" and is obtained by constricting the arc by means of a constricting nozzle placed between a solid cathode and the workpiece to focus or collimate the arc plasma. The constricting mechanism may involve maintaining a thin film of flowing gas between the plasma arc and nozzle surface, to aid in the stabilization.

In addition to "wall stabilization" some of the commercial arc devices also employ what is known to the art as "vortex stabilization" to further focus the plasma arc. Vortex stabilization comprises surrounding the plasma arc with a gas circulating in a plane approximately normal to the plasma and in the space between the lower end of the solid cathode and the nozzle.

The prior art plasma torches are known to produce superior welds at higher welding speeds and at lower amperages, for the same thickness of material, than with the highly regarded Tungsten Inert Gas (TIG) welding process. For example, known plasma torches produce faster butt welds which are less affected by poor edge preparation or edge mismatch than those produced by a conventional TIG torch. The torch to work (standoff) distance is somewhat greater for the plasma torch than for the TIG torch, but due to the collimated arc of the plasma torch the heat affected zone is smaller. The "heat affected zone" is that portion of the base material on either side of the weld bead raised to a temperature sufficiently high to cause structural changes in the material that usually are undesirable from the standpoint of strength or corrosion resistance of the joint.

A shorter standoff distance reduces the ability of the operator to control the weld puddle configuration since the puddle is not readily visible under the torch. In addition, shorter standoff distances increase the reflected heat to the torch, generally decreasing overall torch life.

SUMMARY OF THE INVENTION

In order to avoid the disadvantages found in prior art plasma torches, and to more generally provide an improved plasma torch, it has been found that when a hollow tubular cathode is used and the cathode spot (that portion of the cathode surface from which the arc is emitted) is caused to locate on the inner surface of the cathode, the plasma arc becomes collimated by a new method called cathode stabilization, which does not require nozzle wall stabilization or vortex stabilization. Construction of the hollow tubular cathode so as to allow a small quantity of arc gas to escape up and out of the top of the cathode causes the cathode arc spot to move up onto the interior surface of the cathode thereby collimating the plasma arc.

Therefore, it is the primary object of this invention to provide an improved method of collimating a plasma arc.

It is another object of this invention to employ a hollow cathode to stabilize a plasma arc.

It is still another object of this invention to provide an improved plasma torch for cutting and welding.

It is yet another object of this invention to provide an improved plasma torch by using a hollow tubular cathode into which a small quantity of arc gas is utilized (allowed to flow) to cause the cathode spot to locate on the interior surface of the cathode, so that a collimated plasma arc is produced.

DETAILED DESCRIPTION OF THE PREFERRED EMBODIMENTS

Figure 1:
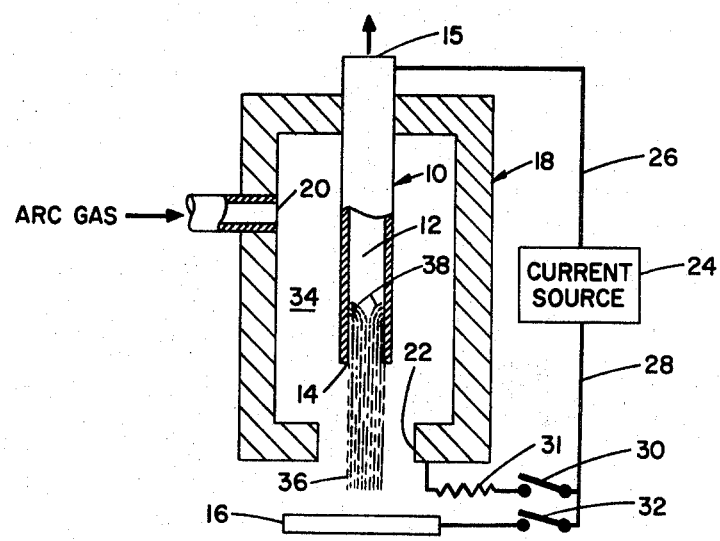
FIG. 1 is a schematic representation of the method according to the present invention.

Referring to FIG. 1 there is shown, in schematic representation, a hollow tubular electrode 10. The tubular electrode 10 is preferably made of tungsten or thoriated tungsten and has a smooth bore 12 with an opening 14 on the downward end, (toward the workpiece 16), and an opening on the upper end 15. Surrounding the electrode 10 is a structure 18 for defining a chamber 34 containing an arc gas inlet port 20 and an orifice 22. The orifice 22 is generally circular in cross section and axially aligned with the longitudinal axis of the electrode 10. The diameter of the orifice 22 must be larger than the inside diameter of the electrode 10 in order for the plasma to become cathode stabilized as will be explained more fully hereinafter. A source of welding current 24 connected by electrical lead 26 so as to make the electrode 10 the cathode or negative portion of the circuit is required to complete the means for carrying out the method of the invention. Electrical lead 28 connects the current source 24 to the structure 18 through a switch 30 and resistor 31 and also to the workpiece 16 through switch 32. The circuit diagram shown is basic to the operation of the plasma arc torch and well known to the art. The structure 18 and/or workpiece 16 becomes electrically positive to create the potential difference necessary to establish the arc.

The arc gas port 20 is so constructed to admit arc gas to surround the cathode 10 uniformly with a quantity of arc gas such as argon without inducing a vortex flow pattern to the arc gas. The major portion of the arc gas will flow down around the cathode 10 toward orifice 22 and out therefrom so as to from a relatively thick sheath of gas thereof between orifice 22 and the plasma arc 36.

However, the orifice 22 is sized such that a small quantity of arc gas is a caused to flow up into the bore 12 of the cathode. While this phenomenon is not fully understood, it is believed that this cold gas flow causes the arc spot to move up into the bore 12 and remain there on the interior surface of the bore 12 as shown in FIG. 1. While it is not necessary, a pump or venturi may be used to aspirate the gas upward through the bore. With such auxiliary equipment, the diameter of the orifice 22 may be increased and/or the flow rate of the gas supplied to chamber 34 may be decreased. However, the preferred mode of operation is as shown in FIG. 1 without any auxiliary pump or venturi.

In operation the arc gas is admitted to the chamber 34 and an arc is struck between cathode 10 and chamber 18 near the orifice 22. The arc gas flow is adjusted so that the cathode spot moves into the bore 12 of the cathode electrode 10 and locates on the bore surface at an area shown as 38. The main current is then applied, between the cathode and the workpiece, causing the plasma arc 36 to issue from the cathode electrode 10 at the lower end 14 in a collimated and stabilized condition. The plasma arc is thus cathode stabilized without need for a wall stabilizing nozzle or vortex stabilization with a gas by means of the known swirl ring. The plasma arc 36 then may be used on the workpiece 16 to cut or weld as desired.

If the cathode 10 is capped or blocked, creating even a larger plenum pressure does not cause the cathode spot to move inside the cathode. It has also been found that once the cathode spot is located inside the cathode electrode the arc gas flow can be reduced to a level below that necessary to initially locate the cathode spot, without the cathode spot coming out of the electrode bore.

The torch shown in FIG. 1 is capable of operating in either the nontransferred or transferred mode as is known in the plasma art. Standard keyhole welds can be made with the cathode stabilized plasma arc torch indicating a true plasma arc welding tool.

Figure 2:
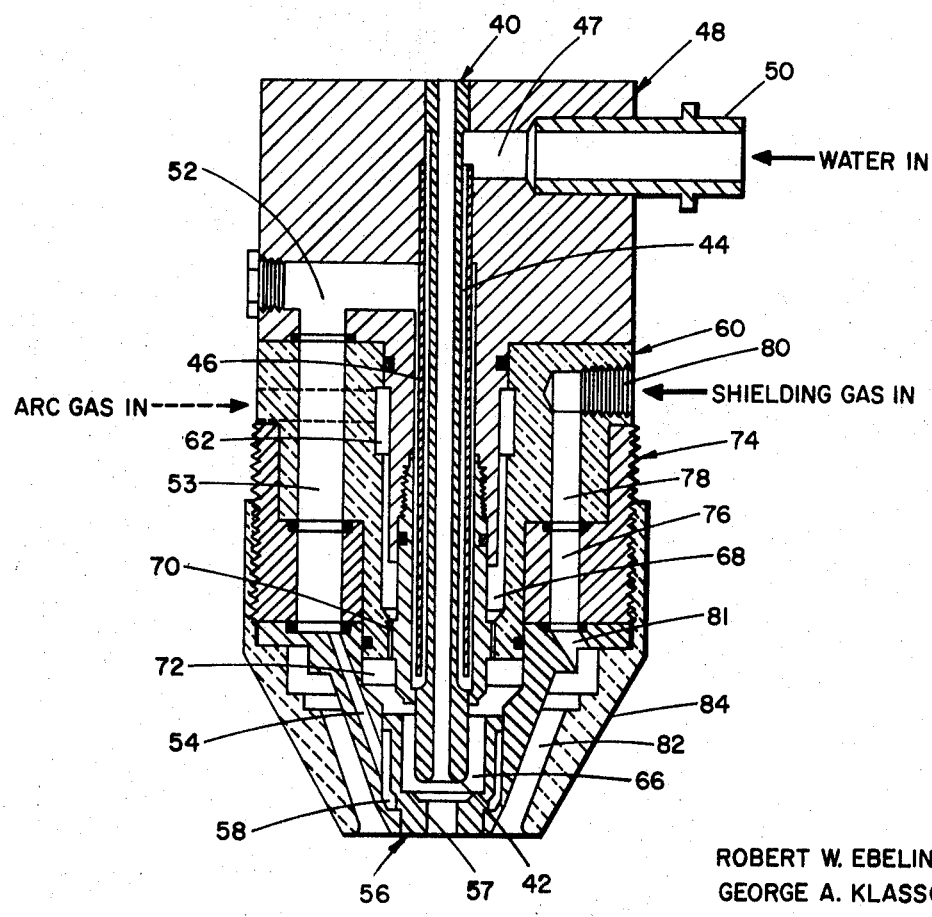
FIG. 2 is a cross-sectional view of a welding torch according to the present invention for producing a cathode stabilized plasma arc.

Shown in FIG. 2 is a cross-sectional view of a plasma arc welding torch constructed and operated according to the present invention.

The hollow cathode is shown as 40 and is cylindrical in shape open at both ends. The lower end 42 of the cathode closest to the workpiece, has a rounded converging entrance to facilitate entry of the arc gas into the bore of cathode 40. The hollow cathode is so constructed as to allow water cooling through almost its entire length by water passages 44, 46 which communicate with an inlet water passage 47 formed in cathode block 48. The passage 47 is fitted with a connection or adapter 50 to admit cooling water to the torch. Cooling water flows down passage 44 around the hollow cathode 40 up passage 46 into passage 52. From passage 52 it flows to passage 54, by passage 53 and around cup-shaped plenum chamber member 56 by means of annular passage 58, and then out of the torch by return passages not shown.

Below the cathode block 48 there is an intermediate member 60 for electrically insulating the cathode block 48 from the cup-shaped member 56, the latter of which forms plenum chamber 66 and functions as the anode. Member 60 may be formed of any commercial nonconducting high temperature insulating material. Member 60 contains the water passages 78, 53 for cooling and helps define annular passage 62, for conducting arc gas to the plenum chamber 66. Entry of the arc gas is by a passage shown by ghost lines to annular passage 62. Arc gas flows down passage 62 to the plenum chamber 66 by other annular conduits 68, 70, and 72. Partially surrounding insulating member 60 is an anode block 74 for directing electrical current to the plenum chamber member 56 for establishing the arc. Anode block 74 is constructed with the necessary gas and water passages to communicate with those in member 60 and cathode block 48. Member 60 contains a shielding gas passage 78 which communicates with gas passage 76 in anode block 74 for admitting shielding gas by means of a threaded hose connector 80. Passage 76 is connected via ports 81 to an annular gas passage 82 defined by anode block 74 and surrounding nozzle 84 for directing the shielding gas around the plasma arc and toward the workpiece. The nozzle 84 can be attached to anode block 74 as by a threaded connection as shown in the FIG. Nozzle 84 should be of a nonconducting material to prevent arcing if the torch accidentally touches the workpiece.

As shown in FIG. 2, O-rings or other sealing means are provided between the various members to prevent leakage of the gas and water.

In operation, the torch of FIG. 2 is connected by known means to the sources of water, arc gas, shielding gas and welding current. One means is to connect the negative side of the current source to cathode block 48 using conductors in the water hose on contact with adapter 50. The positive lead is connected to anode block 74. A pilot arc is struck between end 42 of hollow cathode 40 and plenum chamber member 56. The arc gas flow is then regulated to cause the cathode spot to move up into the cathode 40. The main arc current is then turned on and the plasma arc is caused to issue from end 42 of hollow cathode 40 in a collimate stabilized manner.

As an example, a three thirty-seconds inch inside diameter hollow cathode electrode with an orifice diameter of five-sixteenths inch in a cup-shaped member 56 with about one-sixteenth inch separating the end 42 of cathode 40 from the cup-shaped member 56 produced a stabilized collimated plasma arc.

In order to facilitate entry of the cathode spot, it is desirable that the end 42 of the hollow cathode 40 have a smooth converging entrance to the bore and the inside of the plenum chamber at the orifice have a sharp shoulder. In addition, the arc gas should be introduced in a smooth uniform flow around and down the cathode 40 toward end 42 and preferably in a laminar flow.

Once the plasma arc is initiated, the arc gas flow can be reduced. Increasing the flow can only lead to extinguishing of the arc without improving performance before the pressure necessary to extinguish the arc is reached. The current can be increased to both increase the cathode spot and further improve arc stability.

Gas sheath temperatures were measured at the plenum chamber orifice surface 57 and were found to be between 170° F. at 30 SCFH argon and 30 amperes current and 725° F at 60 SCFH and 200 amperes current. These measurements indicate that the orifice was not constricting the arc and that the arc issues from the hollow cathode collimated and stabilized.

The torch of FIG. 2 was operated at currents up to 400 amperes transferred mode with a five-sixteenth -inch orifice and with 50 SCFH argon flow without sustaining damage. In the nontransferred mode the torch has been operated at the 200 ampere level for about 10 minutes with no sign of damage. Stainless steel plates 0.110 inch thick were butt welded with the torch at 30 inches per minute using 200 ampere current with 15 SCFH argon flow through a three-sixteenth -inch orifice at one-fourth -inch standoff.

Several tests were conducted using the hollow cathode torch of the present invention to compare results with those accepted for two commercial torches. These tests consisted of butt welding stainless steel plates of several thickness and measuring the various welding parameters for each thickness. The results of these tests are set forth in the following Table I:

TABLE I.—PLASMA WELDING CONDITIONS FOR STAINLESS STEEL A COMPARISON OF COMMERCIAL TORCHES WITH HOLLOW CATHODE TORCH

| Torch | Thickness, inch | Speed, i.p.m.[2] | Current, amps | Flow rate and arc gas [1] | Standoff, inch |
|---|---|---|---|---|---|
| A | 1/8 | 30 | 145 | [3] 10 (Ar/H₂) | 3/16 |
| B | 1/8 | 15 | 150 | 2 Ar | 1/4 |
| HC | 1/8 | 30 | 150 | 5 Ar | 3/8 |
| A | 1/4 | 14 | 240 | [3] 18 | 3/16 |
| B | 1/4 | 8 | 200 | 2 Ar | 1/4 |
| HC | 1/4 | 14 | 190 | 10 Ar | 1/2 |
| A | [4] 3/8 | | | | |
| B | 3/8 | 6 | 250 | 3 Ar | 1/4 |
| HC | 3/8 | 6 | 150 | 10 Ar | 3/8 |

[1] Measured in standard cubic feet per hour.
[2] Inches per minute.
[3] 95% Ar, 5% H₂.
[4] Welded in two passes with V-groove egde preparation—230 amp: 9 i.p.m. 1st pass; 220 amp: 7 i.p.m. 2d pass.

NOTE.—Torch A was shielded with 95% Ar, 5% H₂ gas flowing at 35 s.c.f.h. Torch B was shielded with 95% Ar, 5% He gas flowing at 30 s.c.f.h. Torch H C was shielded with 95% Ar, 5% H₂ gas flowing at 35 s.c.f.h.

From the above table it is apparent that the HC (hollow cathode) torch has advantages over the two commercial torches used in the test.

To begin with the standoff distance was larger in each case when using the hollow cathode torch. This assures better visibility of the weld puddle and less heat buildup in the torch.

The above tests show that the 1/8-inch plate the best welding speed was obtained with a lower consumption of arc gas for the same current level. For the 1/4-inch plate the HC torch equaled the best welding speed at lower cure current and gas consumption levels and, for the 3/8 inch plate, the current level was significantly lower although the arc gas consumption was up. The lower current levels lead to increased torch life and allow for more overall design freedom in accomplishing cooling, shielding, etc.

As stated above, the key to the invention is allowing the arc gas to enter the hollow cathode so as to locate the cathode spot up on the inside wall of the hollow cathode. While it is preferred to use a plenum chamber and orifice to create the desired upward gas flow, it is possible to surround the lower end of the cathode with arc gas and using an arc gas venturi, located near the upper end of the cathode, to create the required flow inside the hollow cathode. This would be useful where it is desirable to have an orifice almost equal to the diameter of the plenum chamber. Such a device would find application in plasma generators for the chemical process industry.

The materials of construction used for the hollow cathode need not be limited to tungsten or thoriated tungsten. Other materials such as iron, carbon, alloyed and unalloyed steel can be used.

While we have described our invention by reference to several preferred embodiments, we wish it understood it is to be limited only the scope of the appended claims.

We claim:

1. A method for establishing a collimated plasma arc between an elongated tubular open-ended cathode directed at a workpiece and the workpiece comprising:

surrounding at least a portion of the hollow cathode with a flow of plasma arc gas directed toward the workpiece;

establishing an arc between the cathode end directed at the workpiece and an intermediate electrode; and causing a quantity of arc gas to flow into the hollow cathode in a direction away from the workpiece to locate the cathode arc spot on the interior wall of the cathode so that a collimated arc plasma issues from the hollow cathode.

2. A method according to claim 1 wherein the arc to the intermediate electrode is transferred to the workpiece after the cathode arc spot is positioned on the interior wall of the cathode.

3. A method according to claim 1 wherein there is provided a shielding gas for surrounding the collimated plasma arc.

4. A method according to claim 1 wherein the arc gas is caused to flow into the hollow cathode by a chamber surrounding the hollow cathode and having an orifice between the cathode and the workpiece with an orifice diameter greater than the inside diameter of the hollow cathode.

5. A method for establishing a collimated high pressure arc between an open-ended hollow cathode, the cathode selected from the group consisting of tungsten and thoriated tungsten, and a workpiece comprising:

surrounding at least a portion of the hollow cathode with a flow of arc gas consisting of those gases inert to tungsten directed toward the workpiece;

establishing an arc between the cathode end directed at the workpiece and an intermediate electrode;

causing a quantity of arc gas to flow into the hollow cathode in a direction away from the workpiece so that the cathode arc spot moves into the interior wall of the cathode; and transferring the arc from the intermediate electrode to the workpiece so that the collimated plasma arc is between the cathode and the workpiece.

6. A method according to claim 5 wherein there is provided a shielding gas for the collimated plasma arc.

7. A method according to claim 5 wherein the arc gas is directed into the interior of the cathode by a chamber surrounding the hollow cathode and having an orifice between the cathode and the workpiece with an orifice diameter greater than the inside diameter of the hollow cathode.

8. A plasma welding torch comprising:

an elongated tubular cathode having a generally cylindrical-shaped bore throughout;

means defining a chamber around said cathode for surrounding at least a portion of one end of the cathode with an arc gas;

an orifice in said chamber positioned between the end of the cathode surrounded by the arc gas and a workpiece; the orifice being of a sufficiently small diameter to cause a portion of the plasma-arc gas to flow up into the hollow cathode; and means to provide electrical energy to the cathode.

9. A plasma welding torch according to claim 8 wherein the orifice has a diameter larger than the inside diameter of the hollow cathode.

10. A plasma torch according to claim 8 wherein the hollow cathode of a material selected from the group consisting of tungsten, thoriated tungsten and mixtures thereof.

11. A plasma torch according to claim 10 wherein the extreme end of the cathode surrounded by the arc gas has a rounded configuration.